United States Patent [19]

Vanderlans

[11] 4,421,698

[45] Dec. 20, 1983

[54] SEALING DEVICE FOR USE IN GROUTING PIPE JOINTS AND METHOD OF USING SAME

[76] Inventor: Gerald J. Vanderlans, 1310 W. Turner Rd., Lodi, Calif. 95240

[21] Appl. No.: 408,436

[22] Filed: Aug. 16, 1982

[51] Int. Cl.³ .................. B28B 7/32; B28B 21/20; B29C 1/12

[52] U.S. Cl. .................. 264/40.1; 249/65; 264/40.5; 264/262; 264/263; 264/269; 264/314; 425/170; 425/417; 425/DIG. 14

[58] Field of Search .................. 264/40.1, 40.5, 262, 264/263, 333, 314, 267, 269; 249/65; 425/DIG. 14, 170, 417

[56] References Cited

U.S. PATENT DOCUMENTS

| | | | |
|---|---|---|---|
| 1,463,872 | 8/1923 | Conn | 425/170 |
| 1,911,894 | 5/1933 | Heintz | 425/170 |
| 2,055,885 | 9/1936 | Weston | 264/262 |
| 2,395,216 | 2/1946 | Fitzpatrick | 425/170 |
| 2,612,673 | 10/1952 | Billner | 249/65 |
| 3,272,894 | 9/1966 | Roach | 264/262 |
| 3,368,005 | 2/1968 | Buczala et al. | 264/262 |

FOREIGN PATENT DOCUMENTS 1406736  9/1975  United Kingdom .................. 249/65

*Primary Examiner*—Willard E. Hoag
*Attorney, Agent, or Firm*—Owen, Wickersham & Erickson

[57] ABSTRACT

Method and apparatus for the economic and controlled application of grout at each of a series of joints in a pipeline. A short cylindrical tube is positioned in said pipeline opposite one joint at a time. The tube has an outer wall somewhat smaller in diameter than the inner diameter of the pipeline. The tube has an inner rigid portion and an outer flexible portion bonded to the rigid portion only at each end. There is a through opening at about the axial center of the tube, and the flexible portion only also has a cavity therein at the same place spaced from the through opening and filled with liquid by a flexible conduit sealed to it and extending into the tube's interior to a pressure gauge. Air is sent in between the flexible and rigid portions to swell the flexible portion and urge its outer wall into contact with the inner wall of the pipeline on each side of a joint, thereby sealing off that space. When the pressure exerted on the liquid and applied to the outer wall at said joint reaches a predetermined amount, grout is sent into the space in the joint between the pipeline and the tube, via a fitting member secured in the through opening.

6 Claims, 6 Drawing Figures

SEALING DEVICE FOR USE IN GROUTING PIPE JOINTS AND METHOD OF USING SAME

This invention relates to apparatus for installation of grout in pipeline joints.

BACKGROUND OF THE INVENTION

Often pipelines cannot be assembled in such a way as to be completely leak tight. In such instances, it may be necessary to apply grout at each coupling. For example, where bell and spigot coupling is used, the coupling may be quite satisfactory for joining the pipes together in line, but not satisfactory to prevent leakage at the joints either from or into the pipes. In the case of sewer pipes, in many instances, it is important to prevent leaks at these joints or couplings. Hence, in these instances grout is applied to each joint after the pipe is in place.

The materials comprising the grout are relatively expensive, and wasteful use of grout may amount to a substantial loss of money. For that reason it is important to use only the amount of grout needed, by limiting its application to the space within the coupling. Ordinarily, this has not been done. As soon as the general area of the coupling has been blocked off on both sides, the grout is applied. Sometimes this even results in making it difficult to withdraw the blocking-off equipment.

Moreover, it is important that the operator know when the joint has been properly blocked off so as to leave minimum space to be filled with grout, so that he can then apply the flow of grout. The pressure exerted against the blocking-off equipment in the space can be a good guide as to when grout can most economically be put into the joint.

Thus, it is important to provide a grout-applying system which provides for sealing off the space to be grouted, and also provides for reading the pressure exerted by the air in that space against the outer wall of the grout-applying device. Such combinations are not, so far as I am aware, known in the prior art.

Thus, it is an object of the present invention to provide method and apparatus for applying grout to pipeline joints economically.

Another object is to provide for the application of grout while sealing off on both sides the space where the grout needs to be applied, thereby preventing the waste of grout and confining it to where it is needed.

Another object is to provide for reading the pressure exerted on the outer wall of the unit through which the grout is applied and which is also accomplishing the sealing off, so that it can be known when everything is ready for the application of the grout.

Another object is to provide apparatus in which the grout can be mixed very near the point of application rather than some distance away from it in order to obtain the best characteristics for the finished product.

A further object is to provide for an apparatus for applying grout in which air pressure is used in combination with an elastic plug apparatus for sealing off the area or volume to which grout is to be applied and in which a liquid is employed to sense the pressures applied to the outer wall of the grout-applying apparatus.

SUMMARY OF THE INVENTION

The invention relates to method and apparatus for economic application of grout in a pipeline.

A short cylindrical tube with an outer wall somewhat smaller in diameter than the inner diameter of said pipeline, has an inner rigid portion and an outer flexible portion bonded to the rigid portion only at each end. The tube has a through opening at about its axial center in which is secured a fitting member having an outlet opening at the outer surface of the tube and grout inlet means inside the rigid tube. The flexible portion has a cavity therein at about the axial center, spaced from the through opening, and flexible conduit means is sealed thereto and extends from said cavity into the interior of the tube for conducting liquid into the cavity.

An air-supply conduit leads through the inner portion for sending air therethrough and in between the flexible and rigid portions, to swell the flexible portion and urge its outer wall into contact with the inner wall of the pipeline on each side of a joint.

Thus, the method of this invention comprises positioning in the pipeline opposite one joint at a time this short cylindrical tube, with the through opening at the joint.

Next, the method calls for sending air into the space between the flexible and rigid portions to swell the flexible portion and urge its outer wall into contact with the inner wall of the pipeline on each side of the joint, thereby sealing off that space.

The cavity and the flexible conduit are filled with liquid, and act as a sealed system incorporating a pressure gauge, and the pressure exerted on the liquid and applied to the outer wall at the joint, is observed so that it can be determined when the space has been reduced to the minimum and all is ready. Then grout is sent into the space in the joint between the pipeline and the tube, via the fitting member secured in the through opening, until the pressure of the liquid reaches a predetermined value.

More specifically, the inner rigid portion may comprise a short cylindrical metal tube open at each end and having at each end cable attachment means. This metal tube has at about its axial center first and second, preferably diametrically opposite, through openings, and it has a third through opening in between the axial center and one end.

The flexible portion is preferably a composite member, including a first synthetic rubber coating layer covering and bonded securely to said outer wall of the metal tube at all points between a first coating end and a second coating end. This first coating layer has through openings aligned with each of the first, second, and third openings through the metal tube.

Next, there are, preferably, first and second annular synthetic rubber disc assemblies, each having an annular central portion integral with a radially outer annular disc and a radially inner annular disc. The annular central portion of the first assembly is radially aligned with the first through opening, and the annular central portion of the second assembly is radially aligned with the second through opening. The outer periphery only of the inner disc of each assembly is bonded to the first coating layer. Preferably, the surfaces of the inner discs and of the facing portion of the first coating layer are treated to avoid their becoming bonded together.

Preferably, a bond-preventing material is wrapped around the first layer except for an annular strip at each end thereof and the areas covered by the disc assemblies.

A second, thick, fabric-reinforced synthetic rubber coating layer (which itself may be built up in layers and then vulcanized) is bonded to the first coating at each annular end strip. This layer extends cylindrically all the way between those strips, and has an outer surface for contact of much thereof with the inner surface of the pipeline, an inner surface, and a through opening radially in line with the first through opening. The outer periphery only of each outer disc of each disc assembly is bonded to the inner surface of this second coating layer. This second coating layer also has a cavity therein comprising an annular segment in line with the second disc assembly and a blind opening leading thereinto from its inner surface. This blind opening is aligned with the annular central portion of the second disc assembly and with the second through opening of the metal tube.

An air-supply conduit is connected to the third through opening of the metal tube, for sending air therethrough in between the second coating layer and the wrapping and in between the two discs of each disc assembly, except at the annular central portion. When air is sent under pressure through this conduit, the second coating layer is swelled into contact with the inner wall of the pipeline on each side of the joint and seals off the space to which the grout is to be applied.

Other objects and advantages of the invention will appear from the following description of a preferred embodiment.

DESCRIPTION OF A PREFERRED EMBODIMENT

Figure 1:
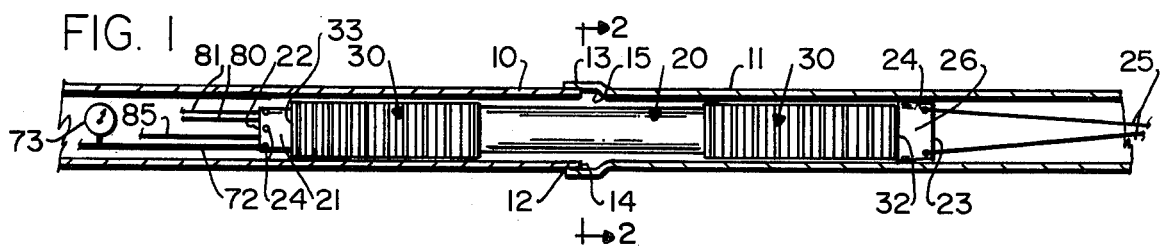
FIG. 1 is a view in side elevation and in section showing a device embodying the principles of the invention installed within a pipeline, with the grout outlet located at the pipe joint. The device is not inflated.
Figure 3:
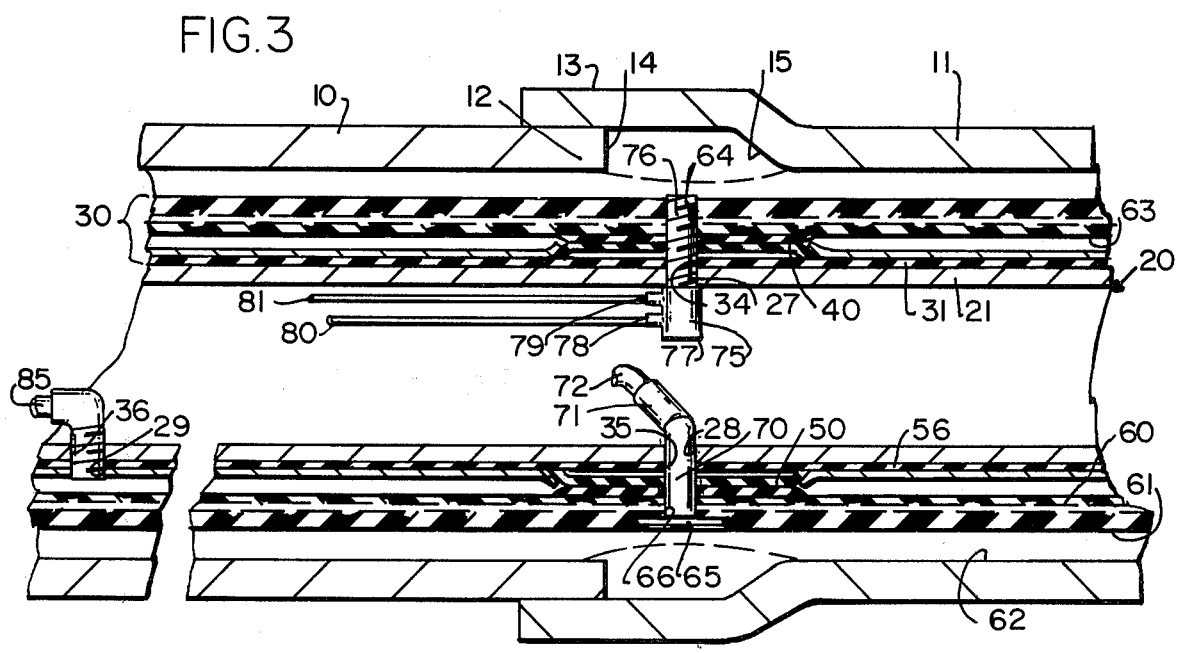
FIG. 3 is a fragmentary view in section on a somewhat reduced scale taken along the line 3—3 in FIG. 2.
Figure 5:
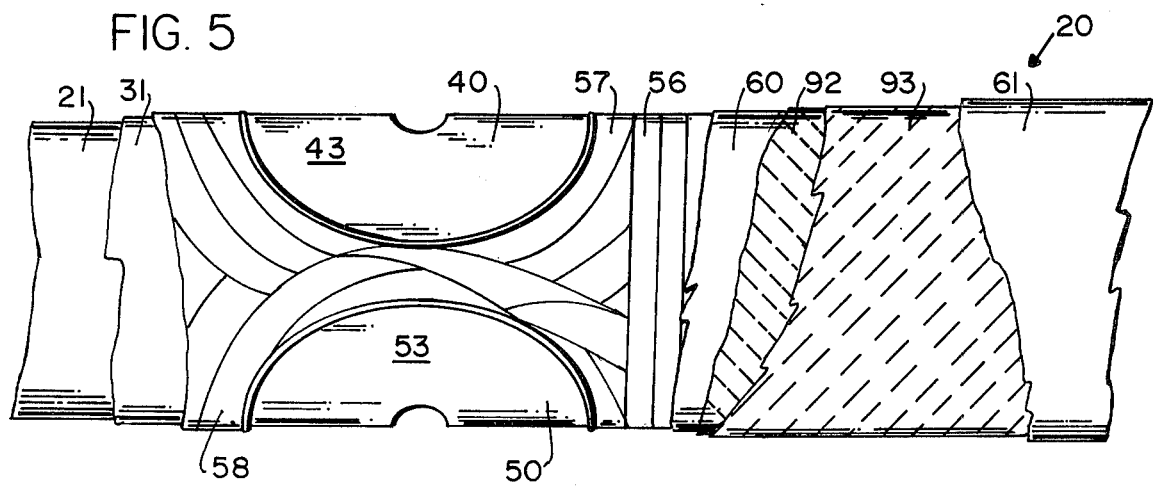
FIG. 5 is a fragmentary view in side elevation, looking directly at the central portion of FIG. 1 but on an enlarged scale, with successive layers, from right to left, stripped away.

FIG. 1 shows a portion of a long pipeline in which two pipe sections 10 and 11 are joined together. The pipe 10 has a spigot 12, while the pipe 11 has a bell 13 into which is fitted the spigot 12, with the spigot's end 14 somewhat spaced from the bell's inner end 15, leaving some space 16, in which the grout is to be applied. The pipes could be closer together or somewhat further apart without affecting this feature of the invention. In any event, it is best that the grout be confined substantially to the space 16 between the bell 13 and the spigot 12.

FIG. 1 also shows an apparatus 20 involving the principles of this invention. As can be seen from this view and even better when looked at in conjunction with FIGS. 2 to 6, the apparatus 20 comprises a short metal tube 21, much shorter than either of the pipe sections 10 and 11 and somewhat smaller in diameter, preferably with about a one-inch clearance on each side when put into the pipes. The tube 21 may be about three or four feet long. Near each end 22 and 23, this tube 21 may be perforated by openings 24 to provide anchorage for cables 25 that are used to pull the apparatus 20 through the pipes 10 and 11, and it may also be provided with a generally cylindrical collar 26 to act as bumper to prevent damage to the forward end 23 of the tube 21. This bumper collar 26 may comprise an inner core of metal covered by elastomer, or may be only elastomer.

The short cylindrical rigid tube 21 has first and second spaced-apart through openings 27 and 28 at about its axial center and a third through opening 29 in between said axial center and one end.

Surrounding the tube 21 is a thick cylindrical flexible tube 30 bonded to the outer wall of the tube 21 at each end and not bonded thereto in between. This flexible tube 30 preferably comprises a first rubber coating layer 31 covering and bonded securely to the outer wall of the tube 20 between a first coating end 32 and a second coating end 33, each spaced in from the respective tube ends 22 and 23. This first coating layer 31 has through openings 34, 35, and 36 aligned respectively with each of said first, second, and third through openings 27, 28, and 29.

First and second annular rubber disc assemblies 40 and 50 each have an annular central portion 41 or 51 integral with a radially inner annular disc 42 or 52 and a radially outer annular disc 43 or 53, each of which has an outer periphery 44, 45, 54, or 55. The annular central portion 41 of the first assembly 40 is radially aligned with the first through opening 27, and the annular central portion 51 of the second assembly 50 is radially aligned with the second through opening 28. The outer periphery 44, 54 only of the inner disc 42, 52 of each assembly 40, 50 is bonded to said first coating layer 31. The surfaces of the disc assemblies 40, 50 and of the facing portion of the first coating layer 31 are preferably treated, as with a silicone grease to avoid their becoming bonded together.

A bond-preventing tape 56 is preferably specially wrapped around the first layer 31 except for annular strips 57, 58 at each end thereof and except for the areas covered by the disc assemblies 40 and 50.

A second, thick fabric-reinforced rubber coating layer 60 (which itself may be initially built up in several layers later vulcanized together) is bonded to the first coating layer 31 at each annular strip 57, 58 and extends cylindrically all the way between those strips. This second coating layer 60 has an outer surface 61 for contact of much thereof with the inner surface 62 of said pipeline, an inner surface 63, and a through opening 64 radially in line with the first through opening 27. The outer periphery 45, 55 only of each outer disc 43, 53 of each disc assembly 40, 50 is bonded to the inner surface 63 of the second coating layer 60.

The second coating layer 60 also has a cavity 65 therein comprising an incomplete annular segment in line with the second disc assembly 50, and a blind opening 66 leads thereinto from the inner surface 63. This opening 66 is aligned with the annular central portion 51 of the second disc assembly 50 and with the second through opening 28 of the metal tube 21.

A small tubular rubber conduit 70 is bonded to the second coating layer 60 in the blind opening 66 and extends into the tube 21 through the second through opening 28 and in freely slipping relation therewith, terminating at a fitting end 71 inside the metal tube 21.

A liquid conduit 72 provides liquid to this rubber conduit 70 and to the cavity 65, and a pressure gauge 73 is connected thereto. The conduits 72 and 70, the cavity 65, and the gauge 73 constitute a sealed, liquid-filled system.

A rigid fitting 75 is threaded into the first through opening 27 and extends through said first annular disc assembly 40 and its annular central portion 41, in movable relation thereto, and through the through opening 64 of the second layer to an outlet 76 at the outer surface 61. This fitting 75 preferably has a closed radial end 77 inside the tube and two axially extending inlets 78 and 79 for connection to two grout ingredient supply tubes 80 and 81.

An air-supply conduit 85 is connected to the third through opening 29, for sending air therethrough in between the second coating layer 60 and the wrapping 56 and in between the two discs 43, 44, and 53, 54 of each, to swell the second coating layer 60 into contact with the inner wall 62 of the pipeline on each side of the joint, for sealing off the space to which grout is to be applied.

It is desirable to incorporate fabric within the second layer 60. At each end, there are one or two layers of fabric 90 providing circumferential threads. In the central portion, there are preferably two layers of fabric 91 and 92 each on the bias. In between, where the layer 60 is to be swelled, fabric 93 is preferably placed with only threads extending longitudinally to provide reinforcement but not unduly to limit swelling. The layer 60 on each side of a central portion 94 is provided with wall-engaging annular ribs 95. The central portion 94 is smooth to prevent sticking to the grout or interlocking with it.

The synthetic rubber may be neoprene throughout.

When the device is in use, it is pulled by suitable cables 25 to a proper position. The gauge 73 is preferably inside the tube and viewable by a closed-circuit television apparatus (not shown).

At that location, air under considerable pressure is introduced via the conduit 85 to force the outer wall 61 of the synthetic rubber (e.g. neoprene) layer 60 against the inner wall 62 of the two pipes 10 and 11, thereby sealing off the joint space 16. This air is prevented, by the two disc assemblies 40 and 50, from causing any leaks at the point where the grout fitting 75 and the liquid fitting 70 are located.

Figure 2:
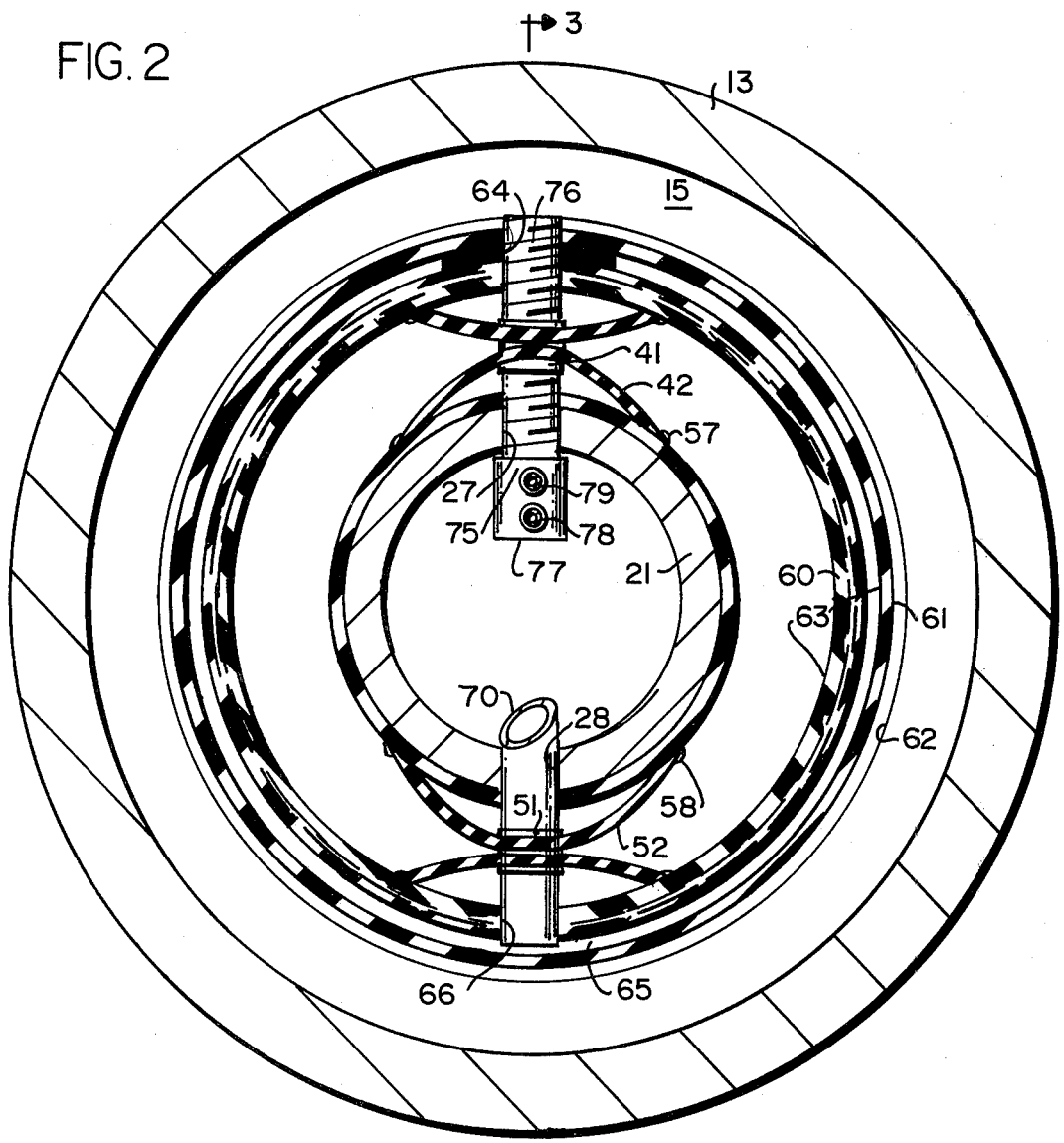
FIG. 2 is a much enlarged view in section taken along the line 2—2 in FIG. 1 showing the central portion of the device. The device is shown partially inflated and in broken lines certain parts are shown in the position they will assume when fully inflated.
Figure 4:
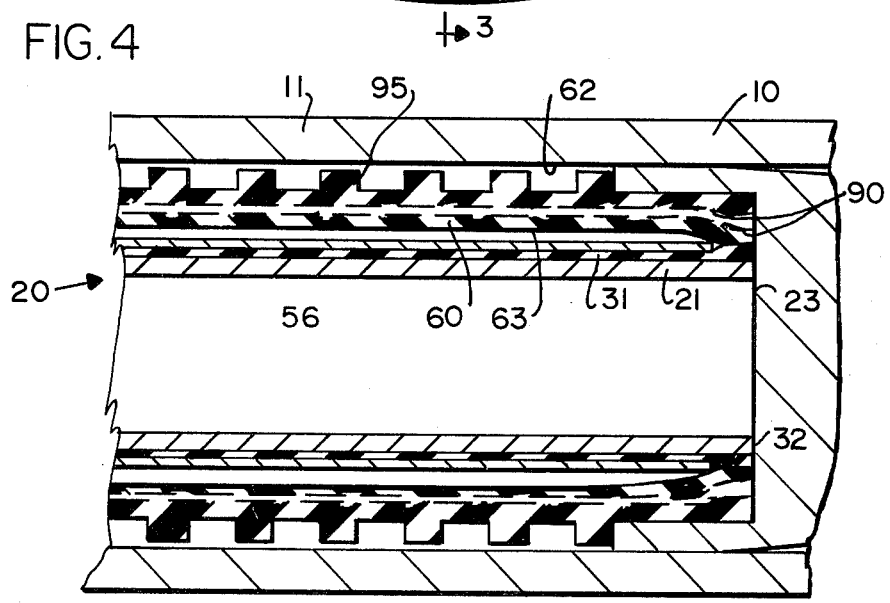
FIG. 4 is a similar view in section of an end portion of the device.
Figure 6:
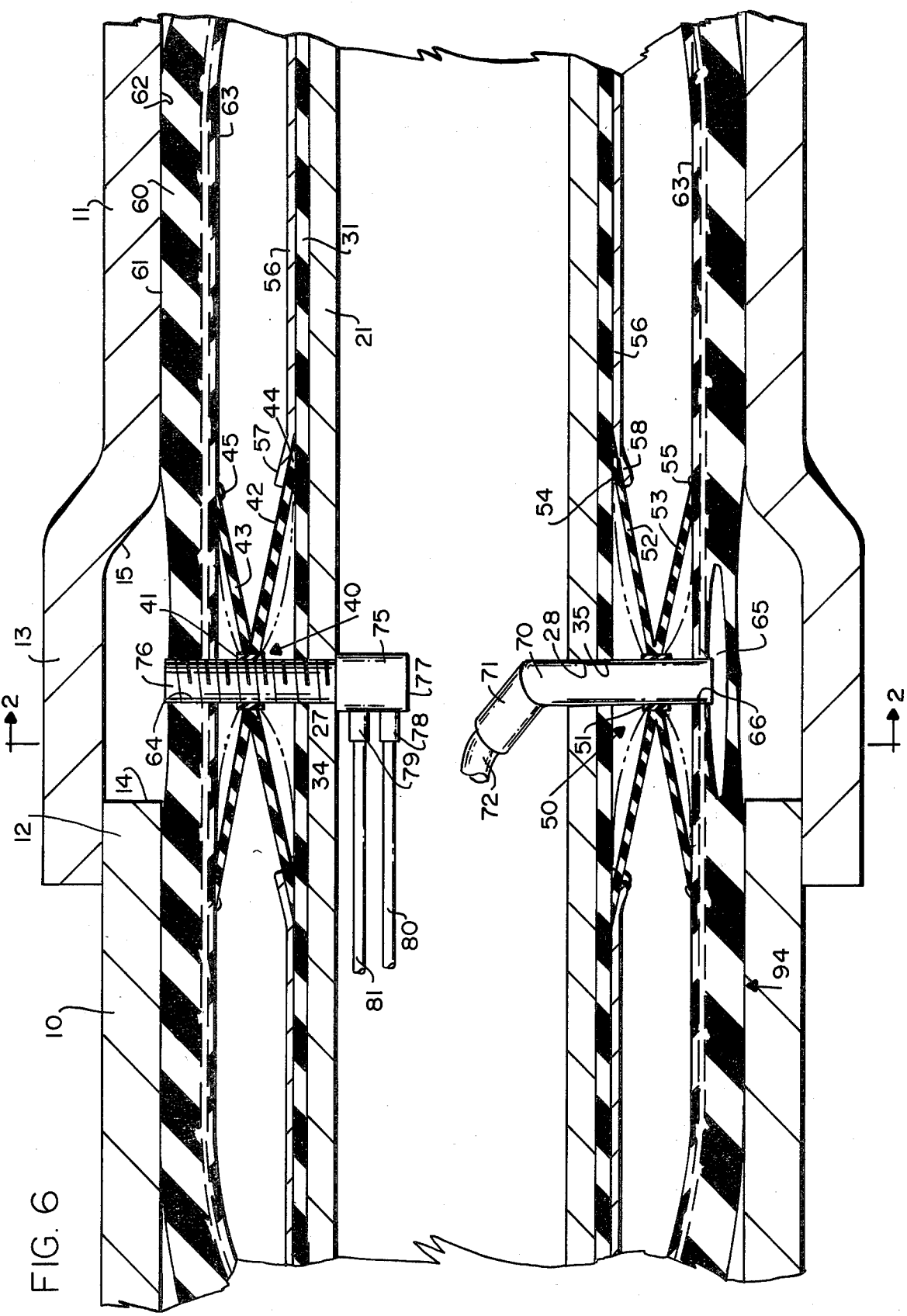
FIG. 6 is a view similar to FIG. 3 on a still larger scale with device partially inflated, broken lines showning the position of some parts when inflation is completed.

Inflation causes the ribs 95 to engage the pipe wall 62 with the central portion 94 being concave because the biased fabric layers 91 and 92 resist expansion. At first, the discs 42, 43 and 52, 53 are spread apart from each other as shown in FIGS. 2 and 6; on full inflation they assume a more rounded U-shape, as shown in broken lines in FIGS. 2 and 6. As the further air pressure is applied, the central portion 94 is somewhat expanded, thereby increasing the pressure exerted on the liquid in the cavity 65. As a result, the gauge 73 reflects the increased pressure. At a pressure value indicating that the device has expanded sufficiently to confine the grout to the desired size of space, the grout is applied through the fitting 75. When the grout is applied to the two lines 80 and 81, the two separate ingredients mix at the grout fitting 75, and flow radially outwardly into the space with the space bounded by the bell 13, the spigot 12, and the rubber member 60. When the grout sets, the device 20 is collapsed by release of air and pulled away, not only from the pipe, but also from the grout, and can then be moved to another location.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

I claim:

1. A method for the economic and controlled application of grout at each of a series of joints in a pipeline, including:

positioning in said pipeline opposite one joint at a time a short cylindrical tube having an outer wall somewhat smaller in diameter than the inner diameter of said pipeline, said tube having an inner rigid portion and an outer flexible portion bonded to said rigid portion only at each end, said tube having a through opening at about its axial center, said flexible portion having a cavity therein at about said axial center, spaced from said through opening, filled with liquid by a flexible conduit sealed to said flexible portion and extending from said cavity into the interior of said tube to a pressure gauge, sending air into the space between said flexible and rigid portions to swell said flexible portion and urge said outer wall into contact with the inner wall of the pipeline on each side of a said joint, thereby sealing off that space, observing the pressure exerted on said liquid and therefore applied to the outer wall at said joint, and sending grout into the space in said joint between said pipeline and said tube via a fitting member secured in said through opening, when the pressure of said liquid reaches a predetermined amount.

2. Apparatus for economic and controlled application of grout at each of a series of joints in a pipeline, including in combination:

a short cylindrical tube having an outer wall somewhat smaller in diameter than the inner diameter of said pipeline, said tube having an inner rigid portion and an outer flexible portion bonded to said rigid portion only at each end, said tube having a through opening at about its axial center, said flexible portion having a cavity therein at about said axial center, spaced from said through opening, a fitting member secured in said through opening and having an outlet opening at the outer surface of said tube and grout inlet means inside said rigid tube, air-supply conduit means leading through said inner portion for sending air therethrough and in between said flexible and rigid portions to swell said flexible portion and urge said outer wall into contact with the inner wall of the pipeline on each side of a said joint, flexible conduit means sealed to said flexible portion and extending from said cavity into the interior of said tube for conducting liquid into said cavity, and sealing means for preventing air from leaving the space in between said rigid and flexible portions except via said air supply conduit means.

3. The apparatus of claim 2 wherein said flexible portion is reinforced by fabric with circumferential threads at each end and by fabric on the bias in the middle near said through opening and is otherwise reinforced by axially extending threads.

4. Apparatus for economic and controlled application of grout at each of a series of joints in a pipeline, including in combination:

a short cylindrical rigid tube having an outer wall and an inner wall, said tube having at about its axial center first and second spaced-apart through openings and having a third through opening in between said axial center and one end, a thick cylindrical flexible tube bonded to the outer wall of said rigid tube at each end and not bonded thereto in between to provide a space there, and having an outer surface, an inner surface, a through opening radially in line with said first through opening, and a cavity therein at about said axial center with a blind opening leading thereinto from the inner surface of said flexible tube and radially aligned with said second through opening of said rigid tube, flexible conduit means bonded to said flexible tube in said blind opening and extending into said rigid tube through said second through opening, terminating at a gauge inside said rigid tube to provide a closed system filled with liquid, for detecting changes in the pressure applied to the outer surface of said flexible tube adjacent said blind opening, a fitting member secured in said first through opening and extending through said through opening of said flexible tube to the outer surface thereof, said fitting member having grout inlet means inside said rigid tube, an air-supply conduit connected to said third opening, for sending air therethrough into the space between said flexible tube and said rigid tube to swell said space and urge said flexible tube into contact with the inner wall of the pipeline on each side of a said joint, for sealing off the space to which grout is to be applied, and sealing means for preventing leakage from said space into said rigid tube and to the outside of said flexible tube.

5. Apparatus for economic and controlled application of grout at each of a series of joints in a pipeline, including in combination:

a short rigid cylindrical tube having an outer wall somewhat smaller in diameter that the inner diameter of said pipeline and having an inner wall, said tube being open at each end and having at each end cable attachment means, said tube having at about its axial center first and second spaced-apart through openings and having a third through opening in between said axial center and one end, a first rubber coating layer bonded to and covering said outer wall of said tube between a first coating end and a second coating end, each spaced from the respective tube ends, said first coating layer having through openings aligned with each of said first, second, and third through openings, first and second rubber assemblies, each having an annular central portion integral with a radially outer flat portion and a radially inner flat portion, each of which has an outer periphery, the annular central portion of said first assembly being radially aligned with said first through opening and the annular central portion of said second assembly being radially aligned with said second through opening, the outer periphery only of said inner flat portion of each said assembly being bonded to said first coating layer, bond-preventing means on and around said first layer except for an annular strip at each end thereof and for the areas covered by said assemblies, a second thick fabric-reinforced rubber coating layer bonded to said first coating at each said annular strip and extending cylindrically all the way between said strips, said second coating having an outer surface, an inner surface, and a through opening radially in line with said first through opening, the outer periphery only of each outer flat-portion of each said assembly being bonded to said inner surface, said second coating layer also having a cavity therein and a blind opening leading thereinto from the inner surface of said second layer, radially aligned with the annular central portion of said second assembly and with said second through opening of said tube, a tubular rubber conduit bonded to said second coating layer in said blind opening and extending through said second assembly in freely slipping relation thereto and into said tube through said second through opening, terminating at a fitting end inside said tube, a sealed liquid system comprising conduit means connected to said rubber conduit and thence to said cavity, all filled with liquid, and pressure gauge means connected thereto, a rigid fitting member secured in said first through opening and extending through said first assembly in movable relation thereto and through said through opening of said second layer to the outer surface thereof, said fitting member having grout inlet means inside said tube, and an air-supply conduit connected to said third through opening, for sending air therethrough in between said second coating layer and said bond-preventing means and in between the two flat portions of each said assembly, except at the annular central portion, to swell said second coating layer into contact with the inner wall of the pipeline on each side of said joint for sealing off the space to which grout is to be applied.

6. Apparatus for economic and controlled application of grout at each of a series of joints in a pipeline, including in combination:

a short rigid cylindrical tube having an outer wall somewhat smaller in diameter than the inner diameter of said pipeline and having an inner wall, said tube being open at each end and having at each end cable attachment means, said tube having at about its axial center first and second diametrically opposite through openings and having a third through opening in between said axial center and one end, a first rubber coating layer covering and bonded securely to said outer wall of said tube between a first coating end and a second coating end, each spaced from the respective tube ends, said first coating layer having through openings aligned with each of said first, second, and third through openings, first and second annular rubber disc assemblies, each having an annular central portion integral with a radially outer annular disc and a radially inner annular disc, each of which has an outer periphery, the annular central portion of said first assembly being radially aligned with said first through opening and the annular central portion of said second assembly being radially aligned with said second through opening, the outer periphery only of said inner disc of each said assembly being bonded to said first coating layer, the surfaces of both said inner discs and of the facing portion of said first coating layer being treated to avoid their becoming bonded together, a bond-preventing wrapping around said first layer except for an annular strip at each end thereof and the areas covered by said disc assemblies, a second thick fabric-reinforced rubber coating layer bonded to said first coating at each said annular strip and extending cylindrically all the way between said strips, said second coating having an outer surface, an inner surface, and a through opening radially in line with said first through opening, the outer periphery only of each outer disc of each said assembly being bonded to said inner surface, said second coating layer also having a cavity therein overlying said second disc assembly and a blind opening leading thereinto from the inner surface of said second layer, said opening leading thereinto from the inner surface of said second layer, said opening being radially aligned with the annular central portion of said second assembly and with said second through opening of said tube, a small tubular rubber conduit bonded to said second coating layer in said blind opening and extending through said second disc assembly in freely slipping relation thereto and into said tube through said second through opening and in freely slipping relation therewith, and a terminating at a fitting end inside said tube, said rubber conduit and said cavity being filled with liquid in a sealed system having pressure gauge means connected thereto, a rigid fitting member threaded into said first through opening and extending through said first annular disc assembly and its annular central portion in movable relation thereto and through said through opening of said second layer to the outer surfaces thereof, said fitting member having grout inlet means inside said tube, and an air-supply conduit connected to said third through opening, for sending air therethrough in between said second coating layer and said wrapping and in between the two discs of each said disc assembly, except at the annular central portion, to swell said second coating layer into contact with the inner wall of the pipeline on each side of said joint for sealing off the space to which grout is to be applied.

* * * * *